United States Patent
Kraibuhler et al.

(10) Patent No.: US 9,845,812 B2
(45) Date of Patent: Dec. 19, 2017

(54) METHOD FOR OPERATING A HYDRAULIC DEVICE WITH PUMP AND SERVOMOTOR, AND ASSOCIATED HYDRAULIC DEVICE

(71) Applicant: ARBURG GMBH + CO. KG, Lossburg (DE)

(72) Inventors: Herbert Kraibuhler, Lossburg (DE); Eberhard Duffner, Starzach (DE)

(73) Assignee: ARBURG GMBH + CO KG, Lossburg (DE)

( * ) Notice: Subject to any disclaimer, the term of this patent is extended or adjusted under 35 U.S.C. 154(b) by 374 days.

(21) Appl. No.: 14/649,598

(22) PCT Filed: Dec. 4, 2013

(86) PCT No.: PCT/EP2013/003660
§ 371 (c)(1),
(2) Date: Jun. 4, 2015

(87) PCT Pub. No.: WO2014/086484
PCT Pub. Date: Jun. 12, 2014

(65) Prior Publication Data
US 2015/0316077 A1    Nov. 5, 2015

(30) Foreign Application Priority Data
Dec. 7, 2012    (DE) .................. 10 2012 023 902

(51) Int. Cl.
*F15B 11/04* (2006.01)
*F15B 21/08* (2006.01)
(Continued)

(52) U.S. Cl.
CPC .............. *F15B 11/04* (2013.01); *B29C 45/82* (2013.01); *F15B 21/008* (2013.01); *F15B 21/08* (2013.01);
(Continued)

(58) Field of Classification Search
CPC ..... B29C 45/82; G05D 16/2066; F15B 11/04; F15B 21/008; F15B 21/08;
(Continued)

(56) References Cited

U.S. PATENT DOCUMENTS

2006/0130919 A1* 6/2006 Ehmann ................ F15B 21/008
138/30

FOREIGN PATENT DOCUMENTS

| AT | 507087 A4 | 2/2010 |
|---|---|---|
| DE | 4302977 A1 | 3/1994 |

(Continued)

OTHER PUBLICATIONS

International Search Report for corresponding application PCT/EP2013/003660 filed Dec. 4, 2013; dated Jun. 4, 2014.

*Primary Examiner* — Logan Kraft
(74) *Attorney, Agent, or Firm* — Cantor Colburn LLP

(57) ABSTRACT

In a method for operating a hydraulic device for providing a supply to hydraulic consumers (V) on a plastics injection moulding machine, provision is made of a pump (10) with a volumetric delivery characteristic that results in cyclic pulsations and of a servomotor (11) with multiple poles that result in cyclic pulsations. The pressure at the hydraulic consumer (V) is detected and is input as an actual value into a pressure regulator (13) that readjusts the servomotor (11), on the basis of a predefined pressure profile, to a pressure setpoint value at the hydraulic consumer (V). The cyclic pressure pulsation is minimized in that, by means of a rotational angle sensor (20), the rotational angle ($\phi$) of the pump (10) and/or of the servomotor (11) is detected and correlated with the cyclic pulsations, and in that, from this, a corrective value or a corrective function is determined and is transmitted to the pressure regulator (13) with control subordinate to the regulation of the pressure setpoint value. Alternatively or in addition, this is achieved in the case of a (Continued)

hydraulic device also in that, as corrective means for the pressure regulation, said means being subordinate to the consideration of the pulsations, the number of components of the pump (10) that result in the cyclic pulsations and the number of components of the servomotor (11) that generate cyclic pulsations are equal, or one is a multiple of the other.

16 Claims, 5 Drawing Sheets

(51) Int. Cl.
      *F16L 55/04*       (2006.01)
      *F15B 21/00*       (2006.01)
      *B29C 45/82*       (2006.01)
      *G05D 16/20*       (2006.01)

(52) U.S. Cl.
      CPC ........ *F16L 55/041* (2013.01); *G05D 16/2066* (2013.01); *F15B 2211/20515* (2013.01); *F15B 2211/20538* (2013.01); *F15B 2211/633* (2013.01); *F15B 2211/6309* (2013.01); *F15B 2211/6333* (2013.01); *F15B 2211/6336* (2013.01); *F15B 2211/6651* (2013.01); *F15B 2211/6653* (2013.01); *F15B 2211/8613* (2013.01); *F15B 2211/8616* (2013.01)

(58) Field of Classification Search
      CPC .. F15B 2211/20515; F15B 2211/20538; F15B 2211/6309; F15B 2211/633; F15B 2211/6333; F15B 2211/6336; F15B 2211/6651; F15B 2211/6653; F15B 2211/8613; F15B 2211/8616; F16L 55/041

See application file for complete search history.

(56) References Cited

FOREIGN PATENT DOCUMENTS

| | | |
|---|---|---|
| DE | 19547308 A1 | 6/1996 |
| DE | 19914403 A1 | 10/2000 |
| DE | 19680008 C1 | 1/2002 |
| DE | 10316946 A1 | 10/2004 |
| DE | 102008019501 A1 | 10/2009 |
| EP | 0431150 B1 | 6/1991 |
| EP | 0649722 B1 | 4/1995 |

\* cited by examiner

METHOD FOR OPERATING A HYDRAULIC DEVICE WITH PUMP AND SERVOMOTOR, AND ASSOCIATED HYDRAULIC DEVICE

CROSS REFERENCE TO RELATED APPLICATIONS

The present application is claiming the priority of the German patent application 10 2012 023 902.5, filed on Jul. 12, 2012, the entire content of which is herein incorporated by reference.

FIELD OF THE INVENTION

The invention relates to a method for operating a hydraulic device for supplying at least one hydraulic consumer, preferably on a machine for processing plastics and other plasticizable materials, comprising a pump and a servo motor.

BACKGROUND

A generic method and a generic hydraulic apparatus are known from DE 196 80 006 C1. It includes a pump, which has a volumetric delivery characteristic resulting in cyclic pulsing, and a servo motor having a plurality of poles resulting in cyclic pulsing. The pressure to the consumer is applied by way of a pressure sensor of a pressure regulator that adjusts the servo motor with the aid of a predetermined or predeterminable pressure profile. Moreover, the rotary angle of the pump and/or the servo motor is detected by way of a rotary encoder.

An apparatus and a method for minimising cyclic pulsing are known from DE 103 16 946 A1. The cyclic pulsing is detected by a sensor, and the measured values are processed in an open-loop/closed-loop control device for triggering an actuator which generates pulses that are at least approximately of the opposite phase to the detected pulsing.

An electrohydraulic control arrangement which can also be used in a plastics injection moulding machine is known from DE 10 2008 019 501 A1. An adjustable fluid pump is connected to a variable-speed electric drive. Pressure and/or volumetric flow are detected and adjusted, by way of a pressure/quantity regulator, to a setpoint value in that a rotational speed setpoint value is provided by means of a variable-frequency drive.

EP 0 431 150 B1 discloses using a brushless dc motor for servo drives, and in so doing minimising cogging, in that the servo motor is operated with a trapezoidal trigger signal and the angular position of the rotor is detected. The trigger signal and the angular position are superimposed such that cogging is reduced. Cogging arises because, in electric motors, the rotor is guided alternately over magnetic and non-magnetic material, with the result that a corresponding detent torque may occur. This generates a sinusoidal current whereof commutation from one winding or magnet to the next is the primary cause of an eccentric running characteristic.

EP 0 649 722 B1 discloses a pressure regulator for a plastics injection moulding machine in which a regulating pump follows the demand from the respective hydraulic consumer, by way of pressure regulator. In addition, the regulating pump is driven by means of a three-phase motor whereof the rotational speed is regulated by a variable-frequency drive such that the pump output of the regulating pump is regulated at the regulating member of the pump in order to keep it below its maximum output, determined by the variable-frequency drive. This makes energy-saving operation possible.

A common feature of the prior art mentioned is that in principle a hydraulic drive circuit is formed by a pump with a servo motor coupled thereto. A pump of this kind may be a fixed displacement pump or a variable displacement pump such as an axial piston pump or a radial pump. Typically, although pumps of this kind convey fluid continuously, this is performed using elements that operate in pulsing manner. Thus, for example, a fixed displacement pump such as an internal gear pump has a certain number of conveying teeth, determined by its construction. In the prior art, hydraulic drive systems of this kind are termed a "servo pump" and used for plastics injection moulding machines as the central drive hydraulics if the machine axes perform serial sequences and are to run to the optimum from an energy point of view. As a result of the large range of rotational speeds at which both the pumps and the servo motors may be operated, it is frequently possible for very large volume outputs to be generated at high speeds with relatively small volumes conveyed by the pump on each revolution. Should the hydraulic consumer need a quasi-static pressure to be regulated, the latter may be regulated by means of a pressure sensor mounted in the hydraulic line to the consumer and corresponding rotational speed regulation of the servo motor with associated open-loop control at a servo motor speed of close to zero, since there are only minimal internal leaks in the pump and consumer system. However, it is specifically in this condition that pulsing of the conveying flow of the pump becomes apparent.

Commercially available pumps, such as, in the case of a fixed displacement pump, a gear pump but also a piston pump, do not have a volumetric flow of fixed speed, in relation to a revolution of the pump, but have a pulse of a certain quantity. This quantity pulse results from the internal mechanical symmetry of the pump construction, such as the number of conveying teeth. In particular in the case of very low rotational speeds and high pressures, the result is thus considerable pressure pulsing, which—for example in the holding pressure phase of an injection moulding machine—has a relatively great effect on the process.

Similar pressure pulsing may also be caused by the structure of the servo motor. The rotor of the servo motor moves within the stator as a result of an electromagnetic field which is generated by applying current and which is generated by commutation of the poles. However, the application of a sinusoidal current also results in a detent torque, so-called cogging, which, in particular at low rotational speed, may also result in pulsing which is attributable to the arrangement of the magnetic and non-magnetic elements within the stator.

Pressure pulsing of this kind could be adjusted in the same way as that sought by the pressure regulator, by regulating the predetermined or predeterminable process pressure. However, the consequence of this is that a very rapid and complex regulator would have to be created, since the pulsing that occurs is affected by the greatest possible variety of system properties, such as the total volumes of oil in the consumer line downstream of the pump, the oil temperature, or the axial position of the consumer. Moreover, the motor and pump have to be coupled very rigidly from a control engineering point of view in order to bring about a pressure profile that is acceptable from a process engineering point of view. The consequence of this is a very high electrical excitation or the application of a very large current, so it is disadvantageous from an energy perspective.

BRIEF SUMMARY

Taking this prior art as a starting point, the invention provides a method for operating a hydraulic device and a hydraulic device in which the cyclic pressure pulsing is minimised.

Taking as a starting point the previously known pressure regulator, the rotary angle of the pump and/or servo motor is detected and is correlated with the cyclic pulsing to determine a correction value or a correction function which is then transmitted to the pressure regulator. In other words, in particular for a quasi-static pressure regulation, the hydraulic properties of the pump and servo motor are communicated to the motor triggering device or the servo regulator, almost in the manner of basic information. Consequently, by means of a regulated rotary angle coupling between the motor and the pump, in particular but not exclusively at low rotational speeds, controlled compensation of the cyclic pulsing that is dependent on rotary angle is made possible.

Preferably, this regulating operation is performed at the servo regulator unit of the servo motor, with the result that the pressure regulator of the higher-level control need only adjust the pressure level desirable for the process by means of the control variable of the motor speed of the servo motor, wherein the rotary encoder automatically compensates for the deficiencies of the pump for each angle of rotation. It is advantageous that, because of the high maximum rotational speed of the motor and as a result of the construction, the servo regulator unit—that is to say the commutation regulator for the servo motor—fundamentally requires fast scanning rates, at present conventionally in the region of 8 or 16 kHz. By contrast, the actual regulated section to the consumer may, in particular in the case of plastics injection moulding machines, have significantly slower response times, wherein typical scanning rates are in the region of 1 kHz. Thus, a cascaded regulation of this kind also makes sense economically, since the higher-level closed-loop and open-loop control for the process pressure manage this task with less processing power. Although the pressure sensor could also act directly on the servo regulator unit and hence transfer the task of directly regulating the desired process pressure to it, in that case a great deal of process information would have to be provided to the servo regulator unit in real time, with the result that a regulator of this kind would need to be adapted very particularly to the respective injection moulding machine. A correspondingly cascaded regulation allows this to be avoided, however.

Preferably, the "basic information" regarding the servo motor/pump unit is detected by connecting a small control orifice in the pump line to the tank by correlating the pressure pulse curve and the motor speed over time. On the basis of this inline section identification, and in accordance with stored system modelling parameters in the higher-level control, it is possible in this way to determine by way of the rotary angle the pressure pulse curve which is representative of the equipment, which is then made available to the pressure regulator.

In principle, therefore, the relationships between the structural conditions of the motor and/or the pump in respect of the pressure pulsing can be mapped. This map is detected and a correction function is formed therefrom. The map can be set at a lower level than the pressure regulator, as a function of rotational speed.

Preferably the modelling analysis is performed by way of a Fourier analysis, a fourth-order Fourier series usually being sufficient. The system parameters determined in this way are transmitted to the servo regulator unit as asynchronous parameters before the hydraulic device is switched on, with the result that the corresponding, preferably cascaded, pressure regulation can take place in real time thereafter.

Additionally, the elements on the pump and the servo motor that trigger the pulsing may also be matched to one another in order to reduce the pressure pulsing mechanically as well. For this purpose, the number of components that result in cyclic pulsing at the at least one pump is equal to the number of components of the servo motor that trigger cyclic pulsing, or the one number is a multiple of the other. Preferably, therefore, the minima of the cyclic pulsing of the servo motor are associated with the maxima of the cyclic pulsing of the pump at the time of assembly.

Further advantages will become apparent from the subclaims and the description below of a preferred exemplary embodiment.

BRIEF DESCRIPTION OF THE FIGURES

The invention will be explained in more detail below on the basis of an exemplary embodiment, with reference to the attached Figures, in which.

DETAILED DESCRIPTION OF PREFERRED EXEMPLARY EMBODIMENTS

The invention will now be explained in more detail by way of example, with reference to the attached drawings. However, the exemplary embodiments are only examples, which are not intended to restrict the inventive concept to a particular arrangement. Before the invention is described in detail, it should be pointed out that it is not restricted to the respective components of the apparatus and the respective method steps, since these components and methods may vary. The terms used here are merely intended to describe particular embodiments and are not used restrictively. Moreover, where the number one or indefinite articles are used in the description or claims, this also includes the plurality of these elements provided the overall context does not unambiguously indicate otherwise.

Figure 1:
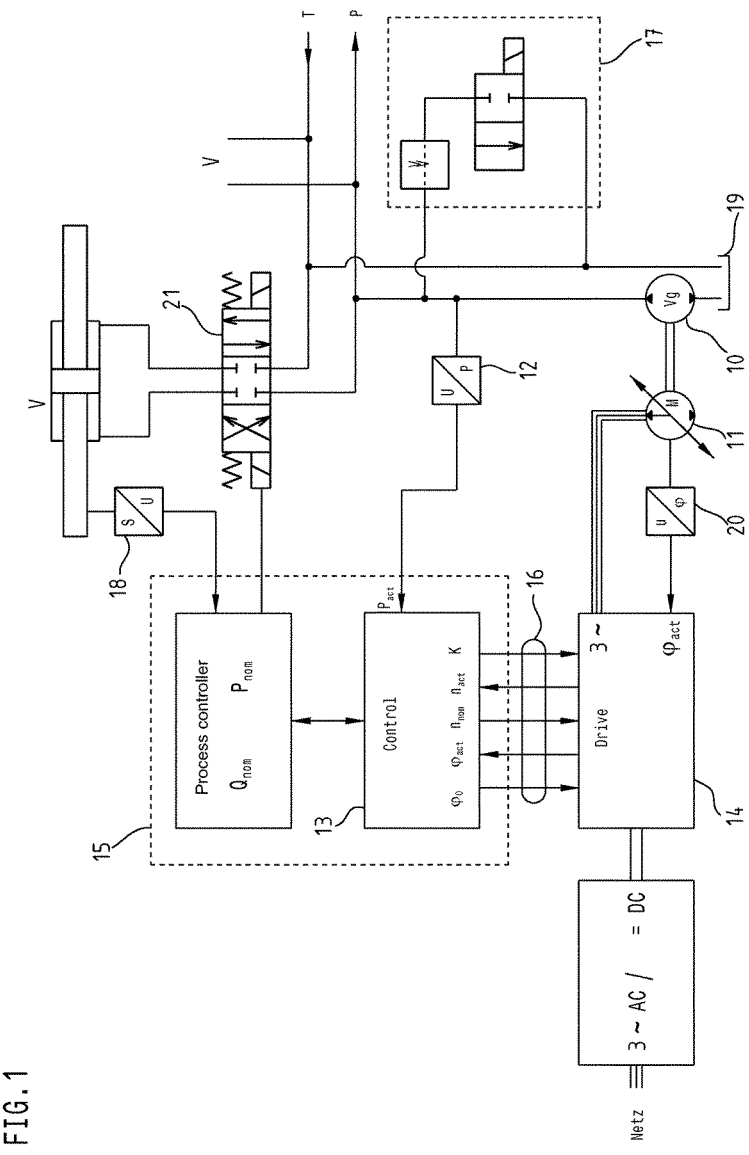
FIG. 1 shows a schematic hydraulic diagram with associated regulating members, such as may be used on a plastics injection moulding machine.

The Figures illustrate a method for operating a hydraulic device for supplying at least one hydraulic consumer V, as can be used for example in a machine for processing plastics and other plasticizable materials such as powdery, ceramic or metal materials. FIG. 1 shows a corresponding schematic hydraulic diagram. Hydraulic medium is made available in a tank 19, from which it is conveyed by way of a pump 10 to various consumers V or axes of the machines. Consumers of this kind may be piston-and-cylinder units, rotary motors, pressure cylinders, ejectors or the like, to mention only a few elements of an injection moulding machine. Here, the hydraulic medium can be fed to the various consumers V by way of valves 21. The pump 10 may be any desired kind of pump, wherein preferably fixed displacement pumps having the same conveyed quantity on each revolution, but also variable displacement pumps such as axial piston pumps or radial pumps, may be used. The pump 10 is driven by a servo motor 11 which is regulated by way of a servo regulator unit 14. By way of a process controller, a setpoint quantity $Q_{nom}$ or a setpoint pressure $P_{nom}$ is made available to the consumers, wherein the position of the consumer is detected, for example by way of a position encoder 18, and this position is adjusted in dependence on a setpoint value by appropriately connecting the pump to the axis of the consumer V by means of the valve 21. In order to make the appropriate quantities or pressures available, the process controller is connected to a pressure regulator 13 which for its part has a regulating effect on the servo regulator unit 14 and hence on the servo motor 11 and the pump 10.

Both the pump 10 and the servo motor 11 may, individually or in themselves, give rise to pulsing which may be adjusted according to the invention. The pump 10 has in principle, as a result of its construction, a volumetric conveying characteristic which results in cyclic pulsing. To this end, the exemplary embodiment is explained below with reference to a fixed displacement pump, even though other types of pump may also be used. A fixed displacement pump, such as an inner gear pump, has a certain number of conveying teeth, with the result that on revolution cyclic pulsing is accordingly established. This pulsing is less perceptible at high rotational speed, but it is precisely in plastics injection moulding machines for example that these hydraulic drive systems are used also in the quasi-static pressure range, since as a result of the large range of speeds in which pump and also servo motor can be operated, relatively small pump conveying volumes are frequently sufficiently to generate very high volume outputs at high rotational speeds on each revolution. Should the consumer require a regulated quasi-static pressure, such as during the holding pressure when manufacturing plastics injection moulded parts, however, although this may be regulated by means of the pressure sensor 12 that is mounted in the hydraulic line to the consumer V and with a corresponding speed control of the servo motor 11 at a servo motor speed of close to zero, it is still the case that during this, in the case of gear pumps, but also in the case of piston pumps, the cyclic pulsing becomes noticeable, since there is no volumetric flow of constant rotary angle for each pump revolution, but rather a certain amount of pulsing occurs, coupled to the internal mechanical symmetry of the pump construction, such as the number of conveying teeth. This cyclic pulsing may have a major effect on the process when manufacturing parts.

A similar effect may be produced as a result of cogging, which may arise from the structure of the servo motor. The rotor is moved within the stator of a servo motor by an electromagnetic field passing from one pole of the motor to another. In this case, the rotor moves alternately over magnetic or magnetisable and non-magnetic material, with the result that as a function of the rotary angle pulsing in the form of detent torques may similarly be established, in particular when the servo motor is operated at low rotational speed. This also results in cyclic pulsing which may have a considerable effect on the process, in particular in the case of an injection moulding machine in the holding pressure phase.

In principle, the pulsing also always takes effect in a manner dependent on rotational speed, with the result that the effect of the rotational speed should preferably also be taken into account. The relationships between the structural conditions of the motor and/or pump and the pressure pulsing are therefore mapped. This map is detected and a correction function is formed therefrom. The map can be set at a lower level than the pressure regulator, as a function of rotational speed. This correction may also be assisted or replaced by structural changes in that for example the same number of pulse-triggering segments or sections is used in the pump and in the motor.

The pressure on the hydraulic consumer V is detected by way of a pressure sensor 12 and is supplied to a pressure regulator 13 as an actual value. This pressure regulator adjusts the pressure applied by the pump 10 by means of the servo motor 11, on the basis of a predetermined or predeterminable pressure profile, to a pressure setpoint value at the hydraulic consumer V. This is supplemented by a rotary encoder 20 which detects the rotary angle cp of the pump 10 and/or the servo motor 11 and correlates it to the cyclic pulsing of the pump 10 and/or the servo motor 11. From this correlation a correction value or correction function is determined and is additionally transmitted to the pressure regulator 13 for regulating the pressure setpoint value.

Preferably, this correction value is transmitted directly to the servo regulator unit 14, with the result that a cascaded pressure regulation becomes possible. This means that what might be called a pre-control, in the control engineering sense, of the cyclic pulsing is carried out at a relatively fast scanning rate by the servo regulator unit 14, while the pressure regulation 13 that is performed by the higher-level control 15 can be performed at a lower scanning rate. Here, the invention exploits the fact that the communication regulator of the servo regulator unit 14 for the servo motor 11 fundamentally needs a fast scanning rate, as a result of its construction, given the high maximum rotational speeds of the motor. Nowadays, scanning rates of 8 or 16 kHz are conventional in this context. Usually characteristic of the actual consumer regulated section, in particular in plastics injection moulding machines, is a regulated section having response times that are slow by comparison with this, conventionally in the region of 1 kHz. Thus, from an economic perspective cascading makes sense, since the pressure regulator 13 of the higher-level control 15 manages this task with less processing power. Since the pre-control has a controlled effect on the equipment behaviour and so has no need of overexcitation of the actuator for compensation, as is usual in closed-loop controls, the method gives an embodiment which is more advantageous from an energy point of view.

Preferably, a fixed displacement pump is used as the pump 10, comprising cyclic pulsing of the volumetric conveying characteristic on each revolution. The pump can moreover let pressure down if required, at least in reversing mode. The servo regulator unit 14 communicates with the higher-level pressure regulator of the control, preferably by way of a digital real-time communication interface 16.

Figure 2:
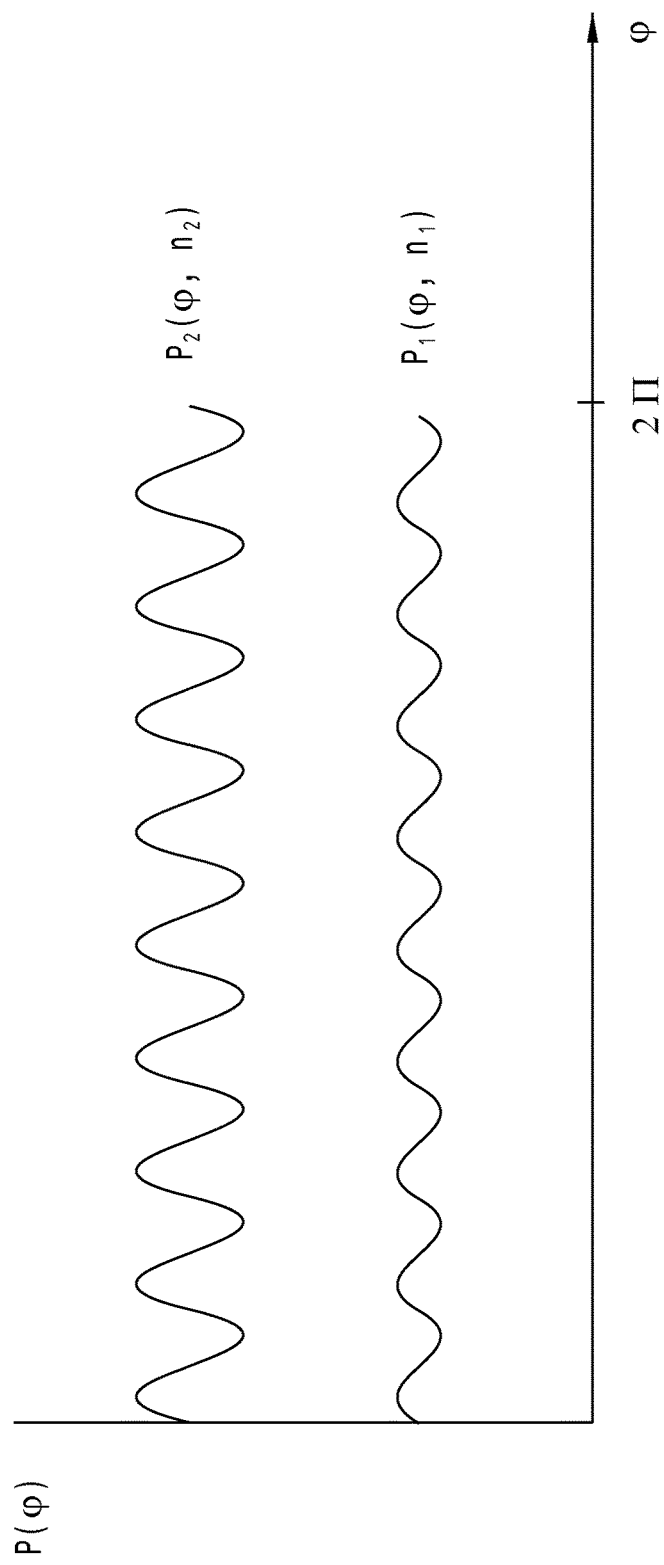
FIG. 2 shows the pressure, as a function of quantity and rotational speed, over the rotary angle of the servo motor.

FIG. 2 shows the pulsing characteristic of the pressure P(φ,n) as a function of the rotational speed n (and hence the volume conveyed Q) over the rotary angle cp. Here, it can be seen that a sinusoidal pulsing occurs, whereof the amplitude is greater at higher pressure. Thus, the correction function is dependent on rotational speed also, and where necessary this must also be taken into account.

The procedure according to the method is as follows. First, the rotary angle φ(t) and the associated pressure pulsing P(t) of the pump 10 and/or the servo motor 11 are detected, wherein this detection is registered, with the control orifice 17 of the pump 10 open, in the consumer circuit at different pressures $P_p(t)$ (corresponding to different minimum speeds n, at the servo motor). The pressure pulse surface plot $(P_i(\phi), n_i)$ is calculated from the surface plot $(P_i(t), \phi_i(t), n_i)$. Using modelling and with the fundamental approach that the pressure pulsing has an additive effect on the otherwise theoretically established system pressure resulting from the setpoint speed, conveying volume of the pump that is not affected by pulsing, and control orifice, the following equation is applied:

$$P_i(\phi) = P_{theoretical}(n_i, Q_i, \text{control orifice}) - K*Y_1$$

to form the pulsing correction factor Y by finding the best fit between the corresponding parameters $\phi_0$, $\Delta\phi_n$, $a_n$ and the desired operational multiplier function $K(P,n)$:

$$Y = K(P_{nom}, n_{nom}) * \Sigma_{n=1}^{4} a_n \sin(n*z*(\phi_{act}+\phi_0)+\Delta\phi_n)$$

where
K is the operational multiplier
$a_n$ is a system coefficient that is representative of the equipment, for the phasing
z is a geometric constant dependent on the number of pump teeth and/or the pole number of the motor (cogging)
$\phi_{act}$ is the actual position of the rotary angle in the servo motor
$\phi_0$ is the mounting offset, virtually at pressure 0, between the encoder zero of the servo motor and the next pump tooth
$\Delta\phi_n$ is the phasing that is representative of the pump, for pulsing at different levels of system pressure of the harmonic of the pulse at the encoder zero of the motor The mounting offset $\phi_0$, which is determined from the mounting of the pump in relation to the servo motor, may be determined in an online equalisation procedure, for example in that with a very small setpoint speed (quasi-static at low pressure), the control orifice 17 open and without any pulse correction, the characteristic curve $(P_0(\phi), n_0)$ is received in the higher-level control 15 and calculated, and then is searched for along the calculated pulse curve $P_0(\phi)$, increasing from $\phi=0$, until the value $P_0(\phi_0)=\max(P_0(\phi))$ is found. The inline adaptation of the mounting offset is primarily required on initial commissioning or possible replacement of the motor or pump during servicing. The method of the preferable best fit approach by means of trigonometric Fourier analysis of the pulse correction function Y has been found to be successful with sufficient accuracy for use in an injection moulding machine.

The operational multiplier K is required to take into account the effect of pulsing that is a function of rotational speed. Conventionally, this operational multiplier K is larger at low rotational speeds than at high rotational speeds—that is to say it is inversely proportional to the rotational speed. However, this need not be the case. In addition, a phase shift $\phi_n$ is produced between the rotary angle $\phi$ and the pulsing $P_i(\phi)$ at different setpoint pressures $P_i$. These system parameters are determined by a modelling analysis, preferably a Fourier analysis. Here, it has been found that reliable modelling of the curve is already possible with a fourth-order Fourier series.

Before the hydraulic device is switched on, the system modelling parameters are transmitted to the servo regulator unit 14 as asynchronous parameters. The rotational speed n of the servo motor 11 is regulated according to the speed setpoint value $n_{nom}$, by the higher-level control 15 with periodic speed correction for each revolution, as predetermined by the system modelling parameters. The operation is adapted in a manner dependent on rotational speed, proportionately by means of the operational multiplier K that is predetermined in real time by the higher-level control 15. System modelling parameters are transmitted predetermined to the servo regulator unit 14 in real time by means of an Ethernet interface, preferably by means of the VARAN protocol.

Figure 3:
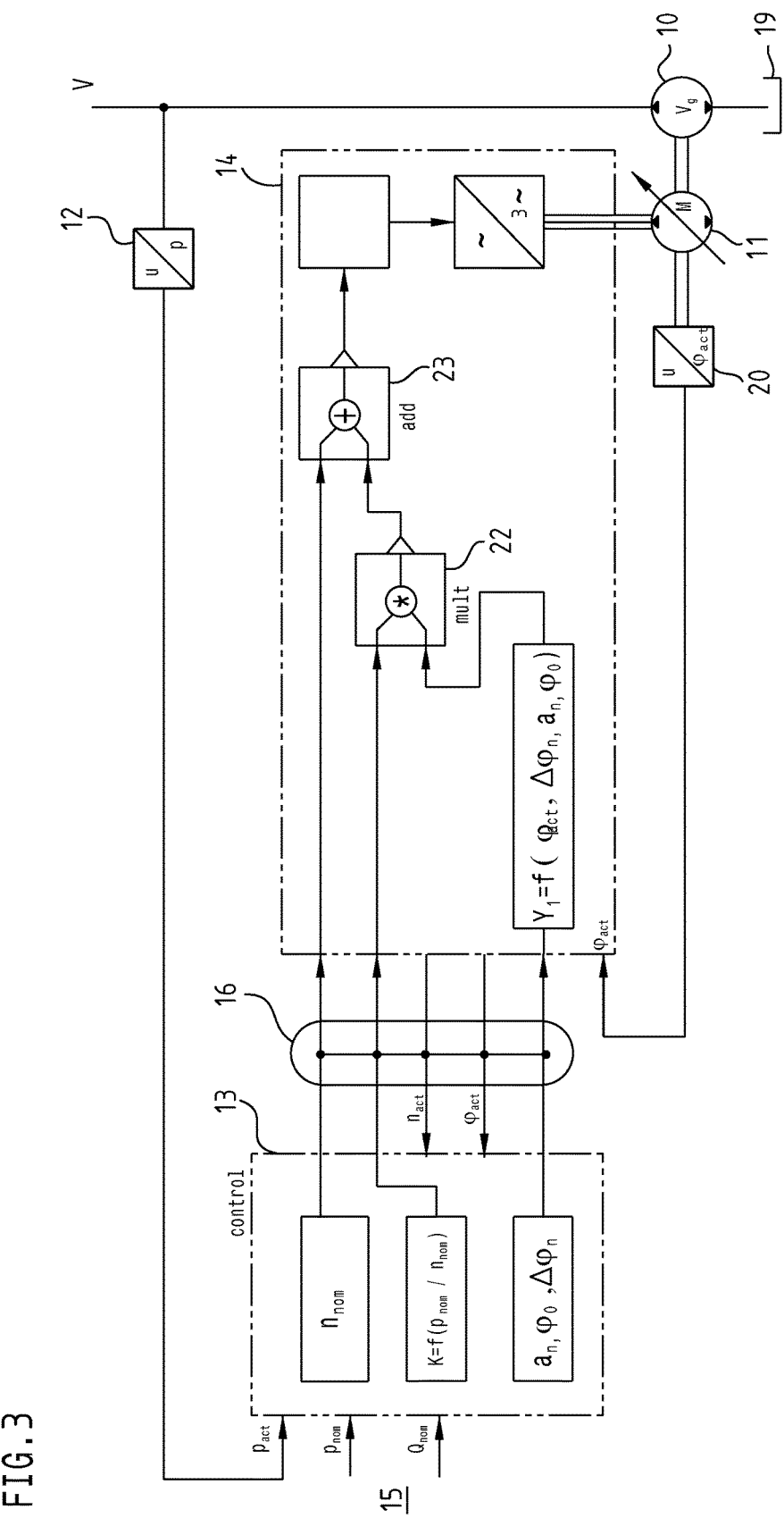
FIG. 3 shows a schematic illustration of the hierarchy of regulation.

Pressure regulation is illustrated schematically in FIG. 3. The pump 10 conveys hydraulic medium out of the tank 19 to the consumer V. For this purpose, the motor 11 is controlled by the servo regulator unit 14. A pressure regulator 12 detects the pressure value $P_{act}$ and passes this to the higher-level control 15. The pressure setpoint value $P_{nom}$ and/or the quantity setpoint value $Q_{nom}$ are also predetermined and sent to the control 15. On the basis of the modelling analysis, the system parameter $a_n$ of the mounting offset $\phi_0$, and the speed-dependent phase shift $\Delta\phi_n$ are also known to the control and are transmitted to the servo regulator unit 14 by way of the interface 16. From the setpoint variables, the pressure control calculates the setpoint speed $n_{nom}$. Moreover, the previously determined correction function $K=K(P_{nom}, Q_{nom})$ is known to the pressure control. The higher-level control 15 moreover receives from the servo regulator unit 14 the current rotary angle $\phi_{act}$ and the rotational speed $n_{act}$ of the servo motor. For this purpose, the rotary encoder 20 that is coupled to the servo motor 11 is connected to the servo regulator unit 14. In the servo regulator unit 14, the operational multiplier K is now first multiplied by the correction function Y1 in the multiplier 22. The value determined in this way is then added to the speed setpoint value $n_{nom}$, in the adder 23. This value is then transmitted to the pressure regulator 13, which thus controls the servo motor 11.

In the context of closed-loop control, first an equalisation is performed of the mounting offset $\phi_0$ between the motor and the pump. On the basis of this, an inline adaptation of the system parameter $\Delta\phi_n$ is performed K, $a_n$ and $\phi_o$, are then transmitted to the servo regulator unit 14. The modelling may be performed as described above, or indeed, equally possibly, offline in a manner specific to the machine type. In the regulating procedure itself, $Q_{nom}$, $P_{nom}$ are predetermined, wherein then $K(Q_{nom}, P_{nom})$ is calculated using the correction function for $n_{nom}$. The required rotational speed $n_{nom}$, is thus calculated as a function of the pressure actual value $P_{act}$, and then the operational multiplier K and the control variable $n_{nom}$ are transmitted to the servo regulator unit 14.

This correction may also be assisted or indeed replaced by structural changes in that, for example according to FIGS. 4 to 7, the same number of pulse-triggering segments or sections is used in the at least one pump 10 and in the servo motor 11, or the one number is a multiple of the other. In this way, the pulse-triggering components 24, 29 on the pump and the servo motor are matched to one another in order to reduce pressure pulsing mechanically as well. Preferably, therefore, the minima of the cyclic pulsing of the servo motor 11 are associated with the maxima of the cyclic pulsing of the pump 10 at the time of assembly.

Figure 5:
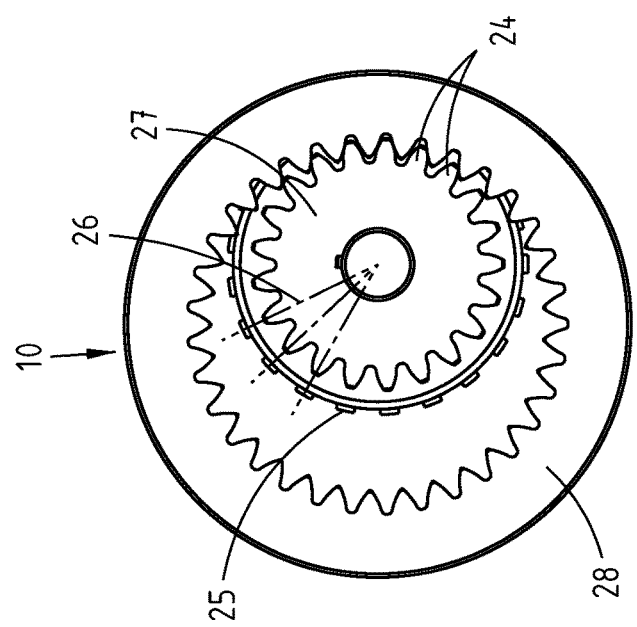
FIGS. 4, 5 show an exemplary embodiment of a coupling between servo motor and pump, in a three-dimensional illustration and in end view.
Figure 4:
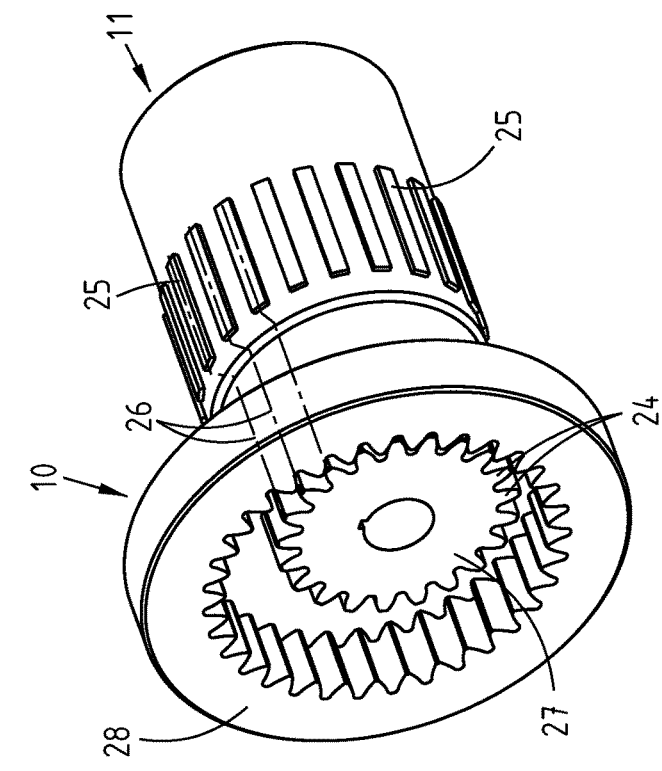

FIGS. 4, 5 show an exemplary embodiment of this kind in which a pump 10 and a servo motor 11 are associated with one another by way of the indicated mechanical coupling 26. Here, as components 24 of the pump 10 the pump teeth are associated with the magnets as components 25 of the servo motor 11. The pump teeth are part of a gear wheel 27 which runs around the ring gear 28 of the pump 10. The number of pump teeth in this case corresponds to the number of magnets, but it is also possible for the one number to be a multiple of the other.

Figure 6:
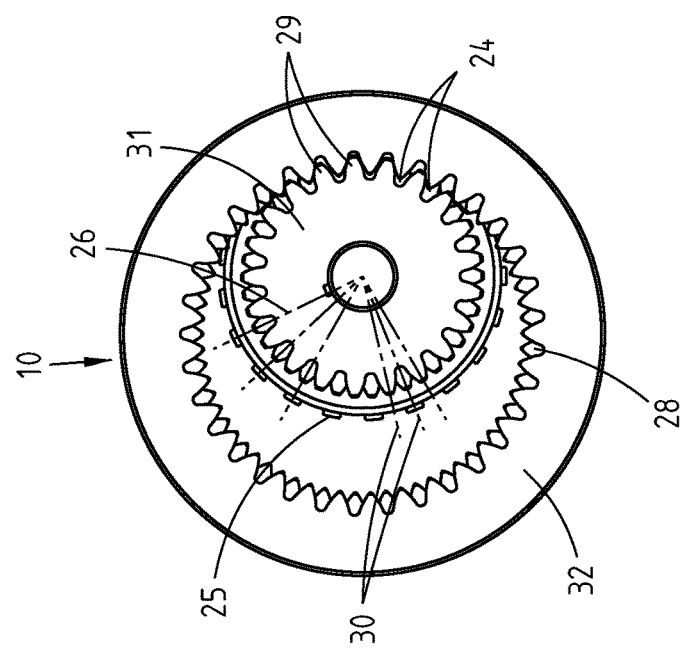
FIGS. 6, 7 show a further exemplary embodiment of a coupling between servo motor and pump, in a three-dimensional illustration and in end view, where two pumps are used.
Figure 7:
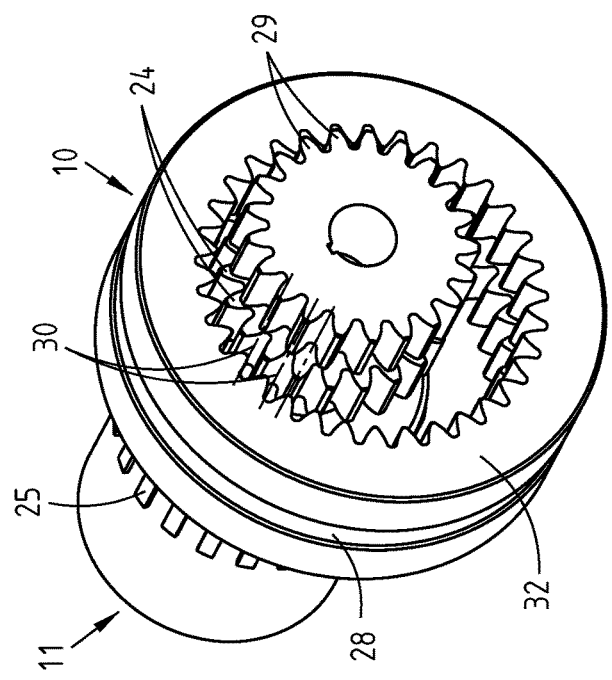

In the exemplary embodiment of FIGS. 6, 7 the components of two preferably structurally alike pumps 10—although there may also be more than two—cooperate with a servo motor by way of a mechanical coupling 30. The components 24, 29 which result in cyclic pulsing, the pump teeth, are in this case offset from one another, that is to say the pump tooth of the one gear wheel 27 is preferably at a gap in the other gear wheel 31. These gear wheels run around in the respective ring gears 28, 32 when the pump is in operation. The mechanical coupling 30 is then made by means of a corresponding association with the components 25—the magnets—of the servo motor 11. Preferably, the two structurally alike pumps are half as large as in the first exemplary embodiment and are mounted on a shaft in the same phase orientation as in the first exemplary embodiment, in order then to compensate one another.

It will be understood that this description may be subject to the greatest variety of modifications, alterations and adaptations that are within the range of equivalents to the appended claims.

The invention claimed is:

1. A method for operating a hydraulic device for supplying at least one hydraulic consumer, wherein the hydraulic device has at least one pump generating a pressure to the hydraulic consumer and comprising a volumetric conveying characteristic resulting in cyclic pulsing and a servo motor having a plurality of poles resulting in cyclic pulsing,
wherein the pressure is detected by way of a pressure sensor and is supplied as an actual value to a pressure regulator which adjusts the servo motor, on the basis of a predetermined or predeterminable pressure profile, to a pressure setpoint value corresponding to a speed setpoint value ($n_{nom}$),
wherein a rotary angle of at least one of the at least one pump and the servo motor is detected by way of in each case one rotary encoder and is correlated to the cyclic pulsing,
wherein from this correlation a correction function is determined, which, multiplied with an operational multiplier, is added to the speed setpoint value, and
wherein the sum calculated is transmitted to the pressure regulator for regulating the pressure setpoint value.

2. A method according to claim 1, wherein a fixed displacement pump is used as the at least one pump comprising cyclic pulsing of the volumetric conveying characteristic on each revolution.

3. A method according to claim 1, wherein the at least one pump lets pressure down if required, at least in reversing mode.

4. A method according to claim 1, wherein a servo regulator unit is associated with the servo motor and carries out a rotational speed-regulated pre-control of the cyclic pulsing at a faster scanning rate than a scanning rate of the pressure regulator, which is carried out by a higher-level control.

5. A method according to claim 4, wherein the servo regulator unit communicates with the pressure regulator of the higher-level control by way of a digital real-time communication interface.

6. A method according to claim 1, wherein detection of a mounting offset of the rotary angle is performed by correlating a pressure pulse signal of at least one of the at least one pump and the servo motor, with a control orifice of the at least one pump in a consumer circuit opened to a minimal extent, in relation to the rotary angle of the servo motor.

7. A method according to claim 1, wherein, to determine the correction function, a system modelling parameter is determined for determining a pressure pulse curve over the rotary angle.

8. A method according to claim 7, wherein the system parameter is determined by a modelling analysis such as a Fourier analysis.

9. A method according to claim 7, wherein, before the hydraulic device is switched on, the system modelling parameter is transmitted to a servo regulator unit as asynchronous parameter.

10. A method according to claim 7, wherein a rotational speed of the servo motor is regulated according to the speed setpoint value by the higher-level control with periodic speed correction for each revolution, as predetermined by the system modelling parameter, and the operation is adapted in a manner dependent on the rotational speed, proportionately by means of the operational multiplier that is predetermined in real time by the higher-level control.

11. A method according to claim 7, wherein the system modelling parameter is transmitted and input to the servo regulator unit in real time by means of an Ethernet interface.

12. A method according to claim 7, wherein the system modelling parameter is at least one of a system coefficient, the operational multiplier, and a phase shift.

13. A method according to claim 1,
wherein, for taking into account the pulsing, structurally a number of one components that result in cyclic pulsing of the at least one pump equals a number of further components of the servo motor that trigger cyclic pulsing, or that the number of the one components or the other components, respectively, is set to a multiple of the number of the other components or the one components, respectively.

14. A method according to claim 13, wherein the at least one pump consists of at least two preferably structurally alike pumps that are offset from one another in respect of the one components and cooperate with the servo motor.

15. A method according to claim 12,
wherein a minimum of cyclic pulsing of the servo motor is associated with the maximum of cyclic pulsing of the at least one pump at the time of mounting.

16. A Method according to claim 1, wherein the consumer is operated on a machine for processing plastics and other plasticizable materials.

* * * * *